United States Patent
Gruber et al.

(10) Patent No.: US 10,430,912 B2
(45) Date of Patent: Oct. 1, 2019

(54) DYNAMIC SHADER INSTRUCTION NULLIFICATION FOR GRAPHICS PROCESSING

(71) Applicant: QUALCOMM Incorporated, San Diego, CA (US)

(72) Inventors: Andrew Evan Gruber, Arlington, MA (US); Lin Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 80 days.

(21) Appl. No.: 15/432,170

(22) Filed: Feb. 14, 2017

(65) Prior Publication Data

US 2018/0232846 A1   Aug. 16, 2018

(51) Int. Cl.
*G06T 1/00* (2006.01)
*G06T 1/20* (2006.01)
*G06T 1/60* (2006.01)
*G06T 15/00* (2011.01)

(52) U.S. Cl.
CPC .......... *G06T 1/20* (2013.01); *G06T 1/60* (2013.01); *G06T 15/005* (2013.01)

(58) Field of Classification Search
None
See application file for complete search history.

(56) References Cited

U.S. PATENT DOCUMENTS

| | | | |
|---|---|---|---|
| 7,318,145 B1 * | 1/2008 | Stribaek | G06F 9/30072 712/219 |
| 7,809,928 B1 * | 10/2010 | Allen | G06T 1/20 345/418 |
| 8,098,251 B2 | 1/2012 | Chen | |
| 8,698,818 B2 | 4/2014 | Pelton et al. | |
| 9,412,193 B2 | 8/2016 | Rosasco et al. | |
| 2005/0055541 A1 * | 3/2005 | Aamodt | G06F 9/30101 712/217 |
| 2006/0158444 A1 * | 7/2006 | Huang | G06F 1/305 345/211 |
| 2012/0268470 A1 * | 10/2012 | Duca | G06T 11/206 345/522 |
| 2013/0135341 A1 * | 5/2013 | Seetharamaiah | G06T 15/005 345/619 |
| 2013/0179663 A1 * | 7/2013 | Heisch | G06F 9/3802 712/207 |

(Continued)

OTHER PUBLICATIONS

Hagdahl S., "Visualization Using 3D Monitor", Department of Interaction and System Design Blekinge Institute of Technology, May 2008, 28 pp.

(Continued)

*Primary Examiner* — Anh-Tuan V Nguyen
(74) *Attorney, Agent, or Firm* — Shumaker & Sieffert, P.A.

(57) ABSTRACT

A GPU may be configured to detect and nullify unnecessary instructions. Nullifying unnecessary instructions include overwriting a detected unnecessary instruction with a no operation (NOP) instruction. In another example, nullifying unnecessary instructions may include writing a value to a 1-bit instruction memory. Each bit of the 1-bit instruction memory may be associated with a particular instruction of the draw call. If the 1-bit instruction memory has a true value (e.g., 1), the GPU is configured to not execute the particular instruction.

4 Claims, 8 Drawing Sheets

(56) References Cited

U.S. PATENT DOCUMENTS

2014/0292771 A1* 10/2014 Kubisch .................... G06T 1/20
                                                        345/501
2016/0210719 A1* 7/2016 Pelton ....................... G06T 1/20
2017/0083330 A1* 3/2017 Burger .................. G06F 9/3004

OTHER PUBLICATIONS

Nottingham A., "GPF: A Framework for General Packet Classification on GPU Co-Processors", Oct. 2011, Retrieved from internet on Nov. 18, 2016, URL: https://www.researchgate.net/publication/267244180, 194 pp.

* cited by examiner

```
                                                    ┌─37A
┌─────────────────────────────────────────────────────────────────┐
│ SHPS Label_MAIN; // Shader Preamble Start                       │ ┌─39A
│   //<<<preamble shader>>>                                       │
│   ...                                                           │
│   // Scalar instructions that save the results in uGPR          │
│   ADD z, y, x; // add x and y and store result in z             │
│   // Instructions that save data to constant RAM                │
│   STC c[5], z; // store z into constant RAM location 5          │
│   ...                                                           │
│   // load 4 constants from constant buffer 1 into constant RAM starting at location 10
│   LDC c[10], index, CB1, 4;                                     │
│   ...                                                           │
│                                                                 │
│ // Instructions that identify unnecessary instructions in the Main shader
│ Identify_Unnecessary (Main shader)                              │
│                                                                 │
│ //Instructions that nullify unnecessary instruction in the Main shader
│ If Identify_Unecessary (Instruction X) = True                   │
│         Instruction X = NOP                                     │
│         X++                                                     │
│ Else                                                            │
│         X++                                                     │
│                                                                 │
│   SHPE; // Shader Preamble End                                  │
│                                                                 │
├─────────────────────────────────────────────────────────────────┤ ┌─41A
│ Label_MAIN:                                                     │
│ ...           // Main Shader                                    │
└─────────────────────────────────────────────────────────────────┘
```

FIG. 3A

```
SHPS Label_MAIN; // Shader Preamble Start
  //<<<preamble shader>>>
  ...
  // Scalar instructions that save the results in uGPR
  ADD z, y, x; // add x and y and store result in z
  // Instructions that save data to constant RAM
  STC c[5], z; // store z into constant RAM location 5
  ...
  // load 4 constants from constant buffer 1 into constant RAM starting at location 10
  LDC c[10], index, CB1, 4;
  ...

// Instructions that identify unnecessary instructions in the Main shader
Identify_Unnecessary (Main shader)

//Instructions that nullify unnecessary instruction in the Main shader
If Check_const (3) = 0
        Instruction 3 = NOP
Else
        End If Check_const(5) = 0
        Instruction 5 = NOP
Else
        End SHPE; // Shader Preamble End
```
```
Label_MAIN:
...           // Main Shader
...
2  Instruction 2
3  DestA = ConstA*InputA+DestA
4  Instruction 4
5  DestB = ConstB*InputB+DestB
...
```

```
SHPS Label_MAIN; // Shader Preamble Start
  //<<<preamble shader>>>
  ...
  // Scalar instructions that save the results in uGPR
  ADD z, y, x; // add x and y and store result in z
  // Instructions that save data to constant RAM
  STC c[5], z; // store z into constant RAM location 5
  ...
  // load 4 constants from constant buffer 1 into constant RAM starting at location 10
  LDC c[10], index, CB1, 4;
  ...

// Instructions that identify unnecessary instructions in the Main shader
Identify_Unnecessary (Main shader)

//Instructions that nullify unnecessary instruction in the Main shader using
1-bit null instruction register
If Identify_Unecessary (Instruction X) = True
        NOP_Reg_X= 1
        X++
Else
        Null_Reg_X=0
        X++

SHPE; // Shader Preamble End

Label_MAIN:
  ...           // Main Shader
```

FIG. 3C

DYNAMIC SHADER INSTRUCTION NULLIFICATION FOR GRAPHICS PROCESSING

TECHNICAL FIELD

The disclosure relates to graphics processing and, more particularly, to instruction nullification for graphics processing.

BACKGROUND

A single instruction, multiple data (SIMD) processing system is a class of parallel computing systems that includes multiple processing elements which execute the same instruction on multiple pieces of data. A SIMD system may be a standalone computer or a sub-system of a computing system. For example, one or more SIMD execution units may be used in a graphics processing unit (GPU) to implement a programmable shading unit that supports programmable shading. A SIMD processing system allows multiple threads of execution for a program to execute synchronously on the multiple processing elements in a parallel manner, thereby increasing the throughput for programs where the same set of operations needs to be performed on multiple pieces of data. A particular instruction executing on a particular SIMD processing element is referred to as a thread or a fiber. A group of threads may be referred to as a warp.

Processing units, such as GPUs, include processing elements and a general purpose register (GPR) that stores data for the execution of an instruction. In some examples, a processing element executes instructions for processing one item of data, and respective processing elements store the data of the item or the resulting data of the item from the processing in the GPR. An item of data may be the base unit on which processing occurs. For instance, in graphics processing, a vertex of a primitive is one example of an item, and a pixel is another example of an item. There is graphics data associated with each vertex and pixel (e.g., coordinates, color values, etc.).

There may be multiple processing elements within a processor core of the processing element allowing for parallel execution of an instruction (e.g., multiple processing elements execute the same instruction at the same time). A shader is a computer program that can utilize a parallel processing environment (e.g., shader processors) and are used to perform graphics rendering techniques on two and three-dimensional models at various stages of the graphics processing pipeline. Examples of shaders include pixel (or fragment) shaders, used to compute color and other attributes of a pixel (or fragment); vertex shaders, used to control position, movement, lighting, and color, or a vertex; geometry shaders, used to generate graphics primitives; tessellation-related shaders (e.g., hull shaders and/or domain shaders that are used when subdividing patches of vertex data into smaller primitives; and compute shaders that are used for computing other information (e.g., non-graphics data).

SUMMARY

In general, the disclosure describes techniques and devices for a graphics processing unit (GPU) to detect and nullify unnecessary instructions in a draw call. In general, an unnecessary instruction may be any instruction that does not change the value of output after executing the instruction. An example of an unnecessary instruction may be an instruction where the output of the instruction is produced by a multiplication by one. In some examples, the value one used in the multiplication may be a constant value. The constant value may be different for different draw calls. However, if the constant value is one for a particular draw call, some instructions that may use such a constant in a multiplication may be unnecessary, as the execution of the instruction may not cause any change to the output.

According to examples of this disclosure, a GPU may be configured to detect and nullify unnecessary instructions. Nullifying unnecessary instructions include overwriting a detected unnecessary instruction with a no operation (NOP) instruction. In another example, nullifying unnecessary instructions may include writing a value to a 1-bit instruction memory. Each bit of the 1-bit instruction memory may be associated with a particular instruction of the draw call. If the 1-bit instruction memory has a true value (e.g., 1), the GPU is configured to not execute the particular instruction.

In some example, a GPU may configured to detect unnecessary instructions by executing all instructions of a draw call in a first warp of a draw call and identifying any instructions that do not produce a change in the output value. Such instructions may be nullified and then not executed in some or all subsequent warps of the draw call. In other examples, a GPU may be configured to execute preamble code before executing the instructions for the draw call. The preamble code may identify and nullify the unnecessary instructions. In this way, detected unnecessary instructions may be nullified before execution.

In one example of this disclosure, a method of graphics processing comprises receiving, by a graphics processing unit (GPU), instructions for a draw call to be executed by the GPU, detecting, by the GPU, one or more unnecessary instructions from the instructions for the draw call, and nullifying, by the GPU, the detected one or more unnecessary instructions.

In another example of the disclosure, an apparatus for graphics processing comprises a processor configured to generate instructions for a draw call, and a graphics processing unit (GPU) configured to receive the instructions for the draw call to be executed by the GPU, detect one or more unnecessary instructions from the instructions for the draw call, and nullify the detected one or more unnecessary instructions.

In another example of the disclosure, an apparatus for graphics processing comprises means for receiving instructions for a draw call to be executed by a graphics processing unit (GPU), means for detecting one or more unnecessary instructions from the instructions for the draw call, and means for nullifying the detected one or more unnecessary instructions.

In another example, this disclosure describes a computer-readable storage medium storing instructions that, when executed, causes one or more processors of a device for graphics processing to receive instructions for a draw call to be executed by a graphics processing unit (GPU), detect one or more unnecessary instructions from the instructions in the draw call, and nullify the detected one or more unnecessary instructions.

The details of one or more examples are set forth in the accompanying drawings and the description below. Other features, objects, and advantages will be apparent from the description, drawings, and claims.

BRIEF DESCRIPTION OF DRAWINGS

FIG. 3A is a conceptual diagram illustrating an example a set of instructions.

FIG. 3B is a conceptual diagram illustrating another example a set of instructions.

FIG. 3C is a conceptual diagram illustrating another example a set of instructions.

DETAILED DESCRIPTION

Figure 1:
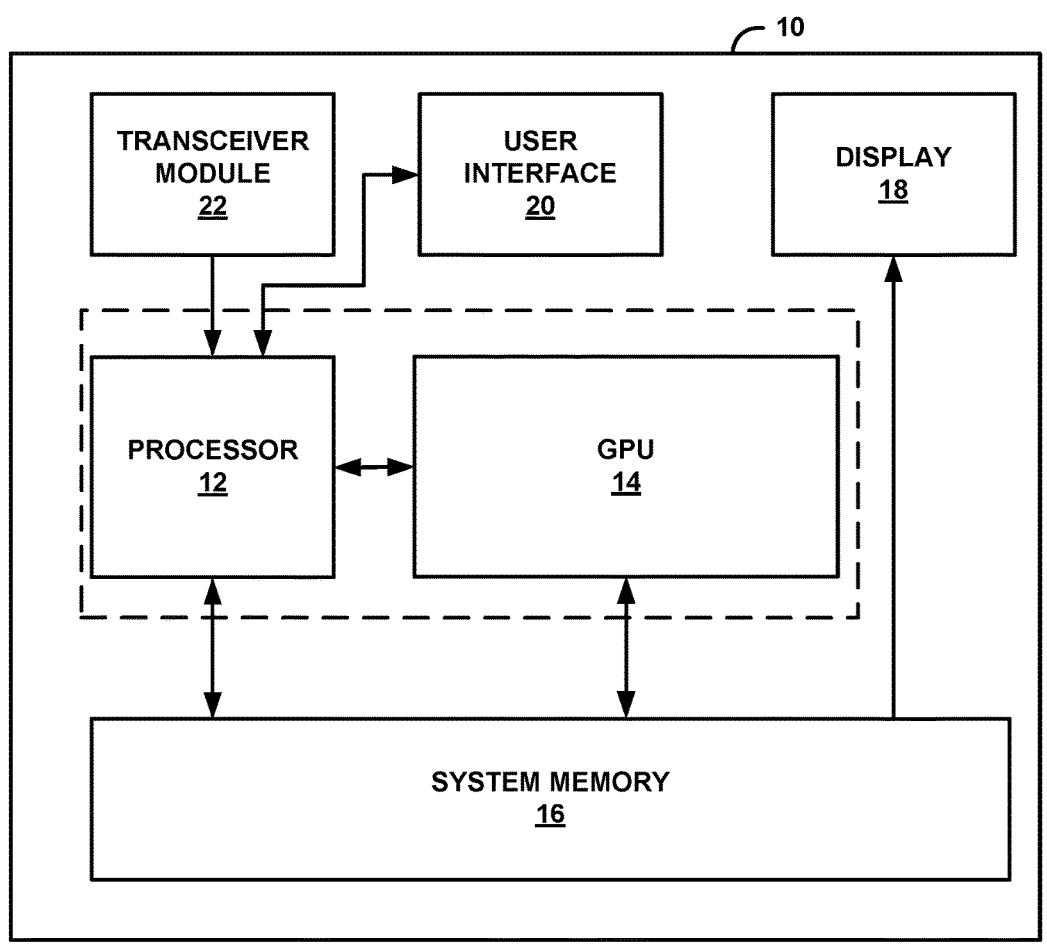
FIG. 1 is a block diagram illustrating an example device for detecting and nullifying unnecessary instructions in accordance with one or more example techniques described in this disclosure.

Parallel processing units, such as graphics processing unit (GPUs) that are configured to perform many operations in parallel (e.g., at the same time or substantially the same time), include one or more processor cores (e.g., shader cores for a GPU) that execute instructions of one or more programs. For ease of description, the techniques described in the disclosure are described with respect to a GPU configured to perform graphics processing applications and/or general purpose GPU (GPGPU) applications. However, the techniques described in this disclosure may be extended to parallel processing units that are not necessarily GPUs or GPGPUs, as well as non-parallel processing units (e.g., ones not specifically configured for parallel processing).

The GPU may be designed with a single instruction, multiple data (SIMD) structure. In the SIMD structure, a shader core (or more generally a SIMD processing core) includes a plurality of SIMD processing elements, where each SIMD processing element executes instructions of the same program, but on different data. A particular instruction executing on a particular SIMD processing element is referred to as a thread or a fiber. A group of threads may be referred to as a wave or warp. All of the processing elements together that execute a warp may be referred to as a vector processing unit, where each lane (e.g., processing element) of the vector executes one thread. Each SIMD processing element may be considered as executing a different thread because the data for a given thread may be different; however, the thread executing on a processing element is the same instruction, of the same program, as the instruction executing on the other processing elements. In this way, the SIMD structure allows the GPU to perform many tasks in parallel (e.g., at the same time).

A shader (or shader program) is a computer program that can utilize a parallel processing environment (e.g., shader processors). A draw command (or draw call) refers to one or more of a family of commands executed by a processing unit (e.g. a CPU) to a graphics application program interface (API) which interacts with a graphical processing unit (e.g. GPU) to draw (e.g. render) an object for display on a display device. A dispatch command refers to one or more of a family of commands executed by a processing unit (e.g. a CPU) to a graphics API which interacts with a graphics processing unit (GPU) to execute non-display operations.

Certain instructions in a draw call or dispatch command may be unnecessary instructions. In the context of this disclosure, unnecessary instructions are instructions that do not produce any change in the underlying variable, value, or output produced by executing the instruction. That is, whether or not the instruction is performed, the value of certain outputs, variables or constants remains the same. As such, performing such unnecessary instructions wastes processing cycles.

In the context of this disclosure, unnecessary instructions may be instructions that do not produce any change in the underlying variable, value, or output produced by executing the instruction in every instance of that instruction in one particular drawcall. That is, an instruction that does not produce any change in one instance during a drawcall, but that does produce change during another instance in the drawcall would not be unnecessary. Such a situation may arise when a variable value causes no change in one instance, but the value of the variable may subsequently change such that a subsequent performance of the instruction does produce a change in the underlying variable, value, or output. Rather, an unnecessary instruction is structured such that no change in the underlying variable, value, or output is produced throughout the duration of the drawcall, typically due to an unchanging constant value.

Examples of unnecessary instructions may include operations that involve multiplications by one and/or adding zero. Such operations may not actually change the underlying value on which an operation is being performed. The "one" and "zero" values that may cause instructions to be unnecessary may be constant values stored in a buffer (e.g., uniform buffer accessible by all processing elements executing a warp in a GPU). Consider the following example instructions:

Out.x=M00*In.x;
Out.x+=M10*In.y;
Out.x+=M20*In.z; //could be NOPed if M20=0;
Out.x+=M30*In.w; //could be NOPed if M30=0;
Out.y=M01*In.x;
Out.y+=M11*In.y;
Out.w+=M33*In.w;

In the example above, Out.x, Out.y, and Out.w are the output values produced by the operations above. The MXX values are constants. In.x, In.y, and In.w are input values of for the operation. According to the operations above, the final value of Out.x is obtained by adding together the products of M00*In.x, M10*In.y, M20*In.z, and M30*In.w (the instruction += adds the operation to the right of the += back to the value to the left of +=).

In the example above, constant values M20 and M30 are zero. In this case, the operation Out.x+=M20\*In.z adds the multiplication of M20 (e.g., which is 0) and In.z back to the value stored in Out.x. Accordingly, the value of Out.x will not change when M20 equals zero, and thus the operation is unnecessary. The same situation is true of the operation using the constant M30. As such, it would be preferable to nullify such an instruction (e.g., perform no operation (NOP) for that particular instruction).

However, a compiler typically cannot determine ahead of time whether or not any particular instruction will not be needed, as the compiler does not have access to the constants that will be stored in a uniform buffer (e.g., constants M20 and M30). Even if a compiler could be modified to detect such constants, the compiler would need to be re-run for every new draw call, even if the shader program itself has not been changed. As such, altering a compiler to detect unneeded instructions would undesirably increase CPU overhead.

This disclosure describes techniques wherein a GPU itself may be configured to detect unnecessary instructions and prevent and/or limit the number of times where unnecessary instructions are executed. According to some examples of a disclosure, a GPU may be configured to receive instructions for a draw call to be executed by the GPU, receive constants to be used when executing the instructions for the draw call, detect, based on the constants, unnecessary instructions, and nullify the detected unnecessary instructions.

FIG. 1 is a block diagram illustrating an example device for processing data in accordance with one or more example techniques described in this disclosure for the detection and nullification of unnecessary instructions. FIG. 1 illustrates device 10, examples of which include, but are not limited to, video devices such as media players, set-top boxes, wireless communication devices, such as mobile telephones, personal digital assistants (PDAs), desktop computers, laptop computers, gaming consoles, video conferencing units, tablet computing devices, and the like.

In the example of FIG. 1, device 10 includes processor 12, graphics processing unit (GPU) 14, and system memory 16. In some examples, such as examples where device 10 is a mobile device, processor 12 and GPU 14 may be formed as an integrated circuit (IC), which may include fixed function and/or programmable processing circuitry. For example, the IC may be considered as a processing chip within a chip package, such as a system on chip (SoC). In some examples, processor 12 and GPU 14 may be housed in different integrated circuits (e.g., different chip packages) such as examples where device 10 is a desktop or laptop computer. However, it may be possible that processor 12 and GPU 14 are housed in different integrated circuits in examples where device 10 is a mobile device.

Examples of processor 12 and GPU 14 include, but are not limited to, one or more digital signal processors (DSPs), general purpose microprocessors, application specific integrated circuits (ASICs), field programmable logic arrays (FPGAs), or other equivalent integrated or discrete logic circuitry. Processor 12 may be the central processing unit (CPU) of device 10. In some examples, GPU 14 may be specialized hardware that includes integrated and/or discrete logic circuitry that provides GPU 14 with massive parallel processing capabilities suitable for graphics processing (e.g., a SIMD processor). In some instances, GPU 14 may also include general purpose processing capabilities, and may be referred to as a general purpose GPU (GPGPU) when implementing general purpose processing tasks (i.e., non-graphics related tasks).

For purposes of illustration, the techniques described in this disclosure are described with GPU 14. However, the techniques described in this disclosure are not so limited. The techniques described in this disclosure may be extended to other types of parallel processing units (e.g., processing units that provide massive parallel processing capabilities, even if not for graphics processing). Also, the techniques described in this disclosure may be extended to processing units not specifically configured for parallel processing.

Processor 12 may execute various types of applications. Examples of the applications include operating systems, web browsers, e-mail applications, spreadsheets, video games, or other applications that generate viewable objects for display. System memory 16 may store instructions for execution of the one or more applications. The execution of an application on processor 12 causes processor 12 to produce graphics data for image content that is to be displayed. Processor 12 may transmit graphics data of the image content to GPU 14 for further processing.

As an example, the execution of an application on processor 12 causes processor 12 to produce vertices of primitives, where the interconnection of primitives at respective vertices forms a graphical object. In this example, the graphics data that processor 12 produces are the attribute data for the attributes of the vertices. For example, the application executing on processor 12 may generate color values, opacity values, coordinates, etc. for the vertices, which are all examples of attributes of the vertices.

In some non-graphics related examples, processor 12 may generate data that is better suited to be processed by GPU 14. Such data need not be for graphics or display purposes. For instance, processor 12 may output data on which matrix operations need to be performed by GPU 14, and GPU 14 may in turn perform the matrix operations.

In general, processor 12 may offload processing tasks to GPU 14, such as tasks that require massive parallel operations. As one example, graphics processing requires massive parallel operations, and processor 12 may offload such graphics processing tasks to GPU 14. However, other operations such as matrix operations may also benefit from the parallel processing capabilities of GPU 14. In these examples, processor 12 may leverage the parallel processing capabilities of GPU 14 to cause GPU 14 to perform non-graphics related operations.

Processor 12 may communicate with GPU 14 in accordance with a particular application processing interface (API). Examples of such APIs include the DirectX® API by Microsoft®, the OpenGL® or OpenGL ES®by the Khronos group, and the OpenCL™; however, aspects of this disclosure are not limited to the DirectX, the OpenGL, or the OpenCL APIs, and may be extended to other types of APIs. Moreover, the techniques described in this disclosure are not required to function in accordance with an API and processor 12 and GPU 14 may utilize any technique for communication.

Device 10 may also include display 18, user interface 20, and transceiver module 22. Device 10 may include additional modules or units not shown in FIG. 1 for purposes of clarity. For example, device 10 may include a speaker and a microphone, neither of which are shown in FIG. 1, to effectuate telephonic communications in examples where device 10 is a mobile wireless telephone. Furthermore, the various modules and units shown in device 10 may not be necessary in every example of device 10. For example, user interface 20 and display 18 may be external to device 10 in examples where device 10 is a desktop computer. As another example, user interface 20 may be part of display 18 in examples where display 18 is a touch-sensitive or presence-sensitive display of a mobile device.

Display 18 may comprise a liquid crystal display (LCD), a cathode ray tube (CRT) display, a plasma display, a touch-sensitive display, a presence-sensitive display, or another type of display device. Examples of user interface 20 include, but are not limited to, a trackball, a mouse, a keyboard, and other types of input devices. User interface 20 may also be a touch screen and may be incorporated as a part of display 18. Transceiver module 22 may include circuitry to allow wireless or wired communication between device 10 and another device or a network. Transceiver module 22 may include modulators, demodulators, amplifiers and other such circuitry for wired or wireless communication.

System memory 16 may be the memory for device 10. System memory 16 may comprise one or more computer-readable storage media. Examples of system memory 16 include, but are not limited to, a random access memory (RAM), an electrically erasable programmable read-only memory (EEPROM), flash memory, or other medium that can be used to carry or store desired program code in the form of instructions and/or data structures and that can be accessed by a computer or a processor.

In some aspects, system memory 16 may include instructions that cause processor 12 and/or GPU 14 to perform the functions ascribed in this disclosure to processor 12 and GPU 14. Accordingly, system memory 16 may be a computer-readable storage medium having instructions stored thereon that, when executed, cause one or more processors (e.g., processor 12 and GPU 14) to perform various functions.

In some examples, system memory 16 may be a non-transitory storage medium. The term "non-transitory" may indicate that the storage medium is not embodied in a carrier wave or a propagated signal. However, the term "non-transitory" should not be interpreted to mean that system memory 16 is non-movable or that its contents are static. As one example, system memory 16 may be removed from device 10, and moved to another device. As another example, memory, substantially similar to system memory 16, may be inserted into device 10. In certain examples, a non-transitory storage medium may store data that can, over time, change (e.g., in RAM).

For example, as described in more detail elsewhere in this disclosure, system memory 16 may store the code for a compiler that executes on processor 12 that performs techniques of one or more examples described in this disclosure. System memory 16 may also store code for shader programs (e.g., a vertex shader, a pixel or fragment shader, tessellation-related shaders, a compute shader, etc.) that execute on a shader core (also referred to as a shader processor or kernel) of GPU 14. Furthermore, system memory 16 may store one or more constant buffers. Constant load instructions may allow a compiler (e.g., compiler 38 of FIG. 2) to load constants from system memory into a constant memory (e.g., constant memory 44 of FIG. 2). In some examples, constants may be loaded into general purpose registers (GPRs) or uniform GPRs (uGPRs) if constant memory is full.

The term graphics item is used in this disclosure to refer to a base unit on which GPU 14 performs parallel processing. GPU 14 may process a plurality of graphics items in parallel (e.g., at the same time). For example, a vertex shader may process a vertex, and GPU 14 may execute a plurality of instances of the vertex shader in parallel to process a plurality of vertices at the same time. Similarly, a pixel or fragment shader may process a pixel of a display, and GPU 14 may execute a plurality of instances of the pixel shader in parallel to process a plurality of pixels of the display at the same time. A vertex and a pixel are examples of a graphics item. For non-graphics related applications, the term "work item" may refer to smallest unit on which GPU 14 performs processing.

As will be explained in more detail below, according to various examples of the disclosure, GPU 14 may be configured to detect and nullify unnecessary instructions. For example, GPU may be configured to receive instructions for a draw call to be executed by GPU 14, detect unnecessary instructions from the instructions in the draw call, and nullify the detected unnecessary instructions. In this way, GPU 14 need not execute any of the nullified instruction, thus improving processing speed and efficiency. In some examples, GPU 14 may be configured to detect the unnecessary instructions before executing the instructions for the draw call. In other examples, GPU 14 may be configured to execute the instructions in a first warp of the draw call and detect the unnecessary instructions from the results of executing the first warp. GPU 14 may then nullify the detected unnecessary instructions and not perform the nullified instructions for subsequent warps of the draw call. In other examples, GPU 14 may further be configured to receive constants to be used when executing the instructions for the draw call, and detect the unnecessary instructions based on the received constants.

Figure 2:
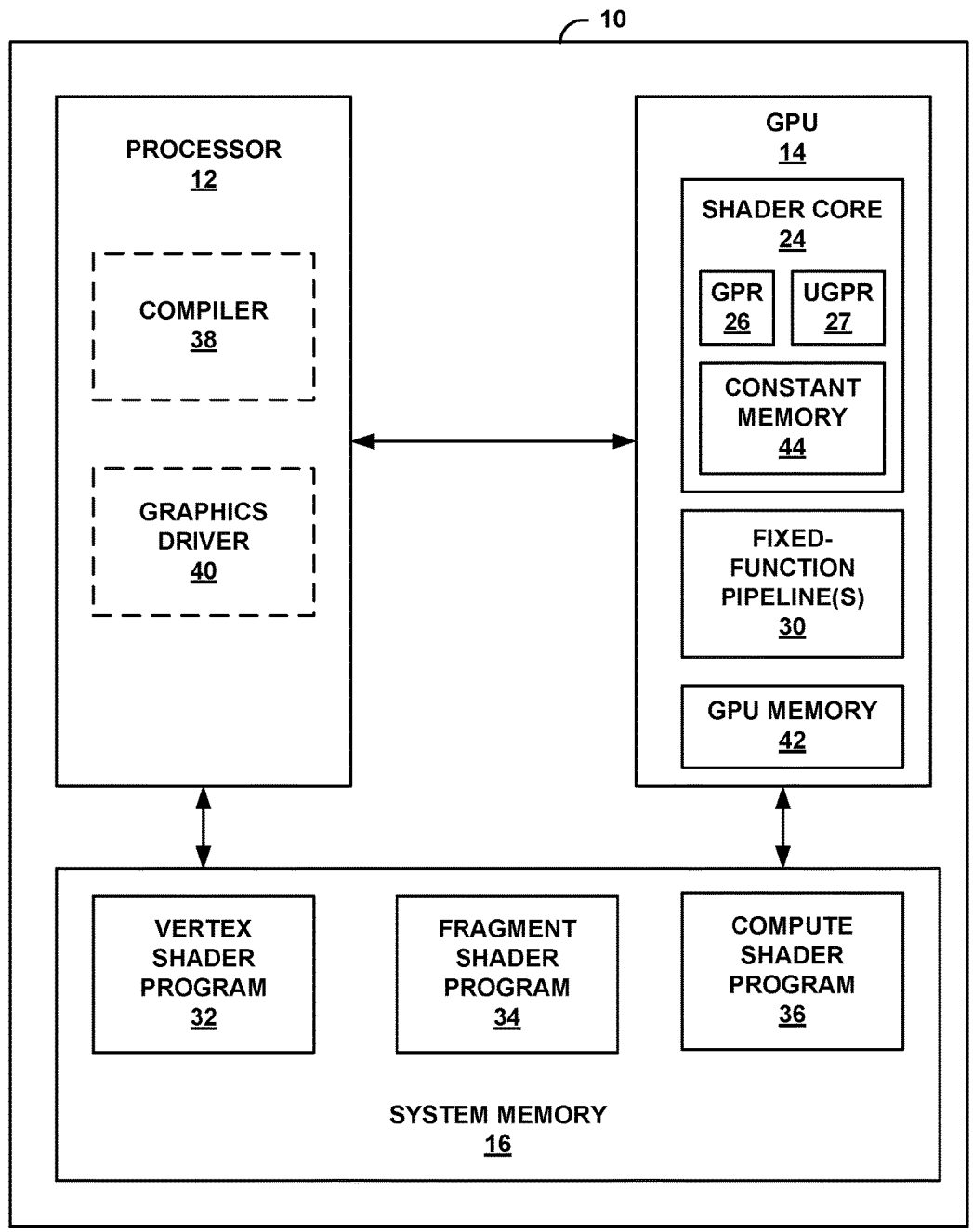
FIG. 2 is a block diagram illustrating components of the device illustrated in FIG. 1 in greater detail.

FIG. 2 is a block diagram illustrating components of the device illustrated in FIG. 1 in greater detail. As illustrated in FIG. 2, GPU 14 includes shader core 24, which includes a general purpose register (GPR) 26, uniform GPR (uGPR) 27, and constant memory 44, fixed-function pipeline(s) 30, and GPU Memory 42. GPR 26 may include a single GPR, a GPR file, and/or a GPR bank. uGPR 27 may include a single uGPR, a uGPR file, and/or a uGPR bank. GPR 26 may store data accessible to a single thread/fiber. uGPR 27 may store data accessible by all threads/fibers in a single warp. Shader core 24 and fixed-function pipeline(s) 30 may together form a processing pipeline used to perform graphics or non-graphics related functions. The processing pipeline performs functions as defined by software or firmware executing on GPU 14 and performs functions by fixed-function units that are hardwired to perform specific functions. Such fixed-function pipelines 30 of GPU 14 may include a texture pipeline, a tessellation stage, clipping content that falls outside the viewing frustum, and lighting.

The software and/or firmware executing on GPU 14 may be referred to as shader programs (or simply shaders), and the shader programs may execute on shader core 24 of GPU 14. Although only one shader core 24 is illustrated, in some examples, GPU 14 may include two or more shader cores similar to shader core 24. Fixed-function pipeline(s) 30 includes the fixed-function units. Shader core 24 and fixed-function pipeline(s) 30 may transmit and receive data from one another. For instance, the processing pipeline may include shader programs executing on shader core 24 that receive data from a fixed-function unit of fixed-function pipeline(s) 30 and output processed data to another fixed-function unit of fixed-function pipeline(s) 30.

Shader programs provide users and/or developers with functional flexibility because a user can design the shader program to perform desired tasks in any conceivable manner. The fixed-function units, however, are hardwired for the manner in which the fixed-function units perform tasks. Accordingly, the fixed-function units may not provide much functional flexibility.

Examples of the shader programs include vertex shader program 32, fragment shader program 34, and compute shader program 36. Vertex shader program 32 and fragment shader program 34 may be shader programs for graphics related tasks, and compute shader program 36 may be a shader program for a non-graphics related task. There are additional examples of shader programs such as geometry shaders and tessellation-related shaders, which are not described for purposes of brevity.

Graphics driver 40 executing on processor 12 may be configured to implement an application programming interface (API); although graphics driver 40 does not need to be limited to being configured in accordance with a particular API. In such examples, the shader programs (e.g., vertex shader program 32, fragment shader program 34, and compute shader program 36) may be configured in accordance with an API supported by graphics driver 40. In an example where device 10 is a mobile device, graphics driver 40 may be configured in accordance with the OpenGL ES API. The OpenGL ES API is specifically designed for mobile devices. In an example where device 10 is a non-mobile device, graphics driver 40 may be configured in accordance with the OpenGL API. Other API examples include the DirectX family of APIs by the Microsoft Corporation. Although not illustrated, system memory 16 may store the code for graphics driver 40 that processor 12 retrieves from system memory 16 for execution. Graphics driver 40 is illustrated in a dashed box to indicate that graphics driver 40 is software, executing on hardware (e.g., processor 12), in this example.

Graphics driver 40 may be configured to allow processor 12 and GPU 14 to communicate with one another. For instance, when processor 12 offloads graphics or non-graphics processing tasks to GPU 14, processor 12 offloads such processing tasks to GPU 14 via graphics driver 40.

As an example, processor 12 may execute a gaming application that produces graphics data, and processor 12 may offload the processing of this graphics data to GPU 14. In this example, processor 12 may store the graphics data in system memory 16, and graphics driver 40 may instruct GPU 14 with when to retrieve the graphics data, from where to retrieve the graphics data in system memory 16, and when to process the graphics data. Also, the gaming application may require GPU 14 to execute one or more shader programs. For instance, the gaming application may require shader core 24 to execute vertex shader program 32 and fragment shader program 34 to generate images that are to be displayed (e.g., on display 18 of FIG. 1). Graphics driver 40 may instruct GPU 14 when to execute the shader programs and instruct GPU 14 with where to retrieve the graphics data needed for the shader programs. In this way, graphics driver 40 may form the link between processor 12 and GPU 14.

In some examples, system memory 16 may store the source code for one or more of vertex shader program 32, fragment shader program 34, and compute shader program 36. In these examples, compiler 38 executing on processor 12 may compile the source code of these shader programs to create object or intermediate code executable by shader core 24 of GPU 14 during runtime (e.g., at the time when these shader programs are to be executed on shader core 24). In some examples, compiler 38 may pre-compile the shader programs and store the object or intermediate code of the shader programs in system memory 16.

As discussed above, according to examples of this disclosure, GPU 14 may be configured to detect and nullify unnecessary instructions. For example, GPU may be configured to receive instructions for a draw call to be executed by GPU 14, detect unnecessary instructions from the instructions in the draw call, and nullify the detected unnecessary instructions. In this way, GPU 14 need not execute any of the nullified instructions, thus improving processing speed and efficiency.

In one example of the disclosure, shader core 24 of GPU 14 may be configured to execute code in a preamble before executing the main instructions of a draw call. As will be explained in more detail below, a preamble may be executed once per draw call before executing the main instruction of the draw call. In some examples, preamble code may be used to perform common instructions (e.g., instructions common to all warps of a draw call) once per shader program execution, rather than executing each of these common instructions for every warp of the draw call. Compiler 38 (or in another example graphics driver 40) running on processor 12 may build a shader (e.g., a shader for a draw call) into multiple components including a "main" shader component and a "preamble" shader component. The main shader component may refer to a portion or the entirety of the shader program that does not include the preamble shader component. Compiler 38 may receive code to compile from a program executing on processor 12. Compiler 38 may insert code, into the preamble shader component, that identifies instructions in the main shader component that are unnecessary. Compiler 38 may further insert code, into the preamble shader component, that nullifies the instructions determined to be unnecessary. Techniques for identifying and nullifying unnecessary instructions will be discussed in more detail below.

Compiler 38 may also identify constant load instructions and common operations in the shader program and then re-position the common operations and constant load instructions within the preamble shader component (rather than the main shader component). Compiler 38 may identify these common instructions, for example, by an exclusive use of constants (i.e., constant values) in the common instructions. Compiler 38 may utilize instructions such as a shader preamble start to mark the beginning of the shader preamble and shader preamble end to mark the end of the shader preamble. Compiler 38 may utilize a SHPS (shader preamble start) instruction to mark the beginning of the per-shader preamble. MAIN is an exemplary label that the SHPS instruction may branch to if the current warp is not the first warp (e.g., to a main shader block of code). Compiler 38 may utilize a SHPE (shader preamble end) instruction to mark the end of the per-shader preamble.

In one example of the disclosure, compiler 38 and/or graphics driver 40 may be configured to insert code into a shader preamble component configured to detect and nullify unnecessary instructions in the main shader component of the draw call. As explained above, unnecessary instructions may include instructions that do not produce any change in the underlying variable, value, or output produced by executing the instruction. Shader core 24 may be configured to execute the shader preamble component in a first warp of the draw call before executing any of the instructions in the main shader component (e.g., the instructions that actually perform the draw call). In this way, shader core 24 may detect and nullify unnecessary instructions before they are executed, thus saving processing cycles, improving processing efficiency, and potentially improving power consumption.

In one example of the disclosure, the code in the preamble shader component may be configured to analyze every instruction of a draw call in order to determine if each instruction is unnecessary or not. In other examples of the disclosure, the code in the preamble shader component may be configured to only analyze a subset of the instructions of a draw call in order to determine if any instructions in the subset are unnecessary or not. In particular, the code in the preamble shader component for detecting unnecessary instructions may be configured to only analyze instructions that are likely to be unnecessary. As one example, the code in the preamble may be configured to only analyze instructions for the draw call that use a constant value as an operand.

In one example of the disclosure, shader core 24 may be configured to receive and/or fetch constant values to use for a particular draw call, along with the shader program for the draw call, the shader program being divided into a preamble shader component and a main shader component, as described above. Shader core 24 may be configured to determine the values for the received constants. As described above, certain constant values may cause an instruction to be unnecessary. For example, multiplications by a constant value of 1 or additions by a constant value of zero may cause an instruction to be unnecessary. Shader core 24 may then be configured to determine, by executing the preamble code, whether or not an output for a particular one of the received instructions will be changed based on a value of a particular received constant used for the particular one of the received instructions. Shader core 24 may make this determination by executing the instruction and determining whether the output of the instruction changed after execution. Shader core 24 may then determine that the particular one of the received instructions is unnecessary if the output is determined to not change.

If a particular instruction is determined to be unnecessary, shader core 24 may then nullify the instruction such that some or all subsequent warps of the draw call do not perform the instruction. Shader core 24 may perform any technique for nullifying the instruction. In one example, shader core 24 may be configured to overwrite the instruction determined to be unnecessary with a no operation (NOP) instruction. In general, a NOP instruction is an instruction that does nothing, including not changing any registers, status flags, or values stored in memory.

In another example, shader core 24 may be configured to nullify an instruction by a writing a value to a 1-bit instruction memory (e.g., a NOP register) associated with the instructions in the draw call. The NOP register may include 1-bit for every instruction of the draw call. Processing elements of shader core 24 may be configured to have access to the NOP register. In one example, a zero value in the NOP register means that the corresponding instruction is to be performed, and a one value in the NOP register means that the corresponding instruction is not to be performed, or vice versa.

Shader core 24 may be configured such that instructions that are nullified through execution of the preamble shader component only remained nullified for one draw call. Because constant values may be different for each draw call, the instructions that may end up being unnecessary may be different for each draw call. Accordingly, at the beginning of each draw call, shader core 24 may be configured to re-fetch any instructions for the draw call so that any instructions converted to NOP instructions are not used. In another example, if the next draw call is the same as the previous draw call, but with different constants, shader core 24 may be configured to convert any instructions converted to NOP instructions back to their original state. In another example, if a NOP register is used, shader core 24 may be configured to reset all values in the NOP register to indicate that all instructions are to be performed before executing any code that detects and nullifies unnecessary instructions.

In the examples above, shader core 24 may be configured to execute many instances of the same instructions of the same shader program in parallel in a draw call. For example, graphics driver 40 may instruct GPU 14 to retrieve vertex values for a plurality of vertices, and instruct GPU 14 to execute vertex shader program 32 to process the vertex values of the vertices. In this example, shader core 24 may execute multiple instances of vertex shader program 32, and do so by executing one instance of vertex shader program 32 on one processing element of shader core 24 for each of the vertices. By executing the preamble shader component before the main shader component, GPU 14 may also be configured to execute all common instructions only once. In addition, GPU 14 may be configured to identify and nullify unnecessary instructions before the unnecessary instructions (e.g., the unnecessary instructions in the main shader program) are executed by shader core 24, as described above.

During the processing of a first warp of the execution of a shader program 32, 34, or 36 on shader core 24, shader core 24 may execute the shader preamble. Constant inputs used in the execution of the shader preamble may be stored in a read/write constant memory 44 (e.g., constant RAM), GPRs (e.g., GPR 26), or uGPRs (e.g. uGPR 27). A load unit of shader core 24 may load the constants into constant memory 44. Instructions to the load unit of shader core 24 may be found within the per-shader preamble code block and may allow constants to be loaded from system memory 16 to on-chip constant memory on GPU 14.

In some examples, the shader preamble may be executed by a scalar processor (e.g., a single arithmetic logic unit (ALU)) on shader core 24. In other examples, the shader preamble may be executed by the parallel processing elements of shader core 24 (sometimes called a vector processor).

In other examples, execution of the shader preamble in a first warp may result in the generation and/or assignment of a constant value or set of values. The constant value preamble result may be stored in on-chip memory such as in uGPR 27, constant memory 44 (e.g., constant RAM), GPU memory 42, or system memory 16. Constant memory 44 may include memory accessible by all elements of the shader core 24 rather than just a particular portion reserved for a particular warp or thread such as values held in uGPR 27 or GPR 26. Constant memory 44 may also store data persistently between warps rather than needing to be reloaded with data prior to each warp.

During execution of the shader in a subsequent warp of the shader (e.g., the main shader component), the instructions identified as being unnecessary during the execution of shader program 32, 34, or 36 in the first warp (e.g., executing of the shader preamble) may be skipped as they were nullified the preamble. In addition, during execution of a subsequent warp of the shader, the constant values (i.e. preamble results) calculated during the first warp of the execution of shader program 32, 34, or 36 may be retrieved from constant memory 44 rather than re-executing the redundant code.

In some examples, GPU 14 may be configured such that only the first warp of the shader executes the shader preamble. GPU 14 may ensure that only the first warp of the shader executes the shader preamble via a flag in an on-chip internal state register, constant memory 44, or GPU memory 42. GPU 14 may also track that a warp that started execution of the shader preamble is the first warp. The flag denoting that a current warp is the first warp (or, in another example, that it is not the first warp) may be stored, by GPU 14, as a value in an on-chip internal state register, constant memory 44, or GPU memory 42. GPU 14 may also track whether the first warp has completed execution of the shader preamble instructions. The flag denoting the first warp has (or, in another example, has not) completed execution of the shader preamble instructions may be stored, by GPU 14, in an on-chip internal state register, constant memory 44 or GPU memory 42. Shader core 24 can utilize these flags to determine whether to execute the shader preamble (e.g., if this is the first warp and/or the preamble has not been executed previously) or not (e.g., if this is not the first warp and/or the preamble has been executed previously). Shader core 24 may also delay execution of a second warp of threads of shader program 32, 34, or 36 until completion of the execution of the shader preamble and loading of the constant results of the preamble in constant memory 44, GPU memory 42, or uGPR 27 by the GPU 14.

In an example, each type of shader core 24 can access context (e.g., flag) bits stored in an on-chip internal state register. Shader core 24 may have a 1-bit preamble_token_taken context bit that may indicate that the present warp is/is not the first warp and/or a warp (or no warp) on shader core 24 has started to execute the preamble. Both of these bits may be initialized to false when a particular type of shader (e.g. shader core 24) is loaded. For example, a first warp to execute a SHPS (e.g. a shader preamble start) instruction in a given shader core 24 or shader type finds the preamble_token_taken flag as false. Shader core 24 will set the preamble_token_taken flag to true. When the first warp executes a SHPE (e.g. shader preamble end) instruction, shader core 24 sets the preamble_completed flag to true. Shader core 24 will then continue executing code from the main shader instruction label. In a non-first warp, the preamble_token_taken flag may be set to true. All subsequent warps branch to the main code section (e.g., a MAIN label) and wait there until preamble_completed flag changes from false to true. When the change of the preamble_completed flag changes from false to true, shader core 24 executes subsequent warps.

FIG. 3A is a conceptual diagram showing a set of instructions 37A that includes a shader preamble 39A and main shader instructions 41A. Instructions 37A may be the instructions in any of vertex shader program 32, fragment shader 34, or compute shader program 36 of FIG. 2, or any other type of shader program. In this example, shader preamble 39A comprises a shader preamble start instruction (SHPS). The shader preamble start instruction will branch to the "Label_MAIN" label (e.g., in the main shader instructions 41A) if the preamble_token_taken flag is set to true to only allow the shader preamble to be executed a single time. The instruction may also instruct the shader core 24 to set the preamble_token_taken flag to true when the preamble_token_taken flag is set to false.

In the example of FIG. 3A, the instructions in the shader preamble 39A may include instructions that produce the same results for all threads of the shader (e.g., because such instructions only operate on constant values) and do not change between warps of shader execution. These instructions may be identified by the compiler 38, as described above. By executing such instructions in the preamble, they are only executed once, rather than for every thread. The instruction ADD z, y, x illustrates a redundant instruction in the shader code. This instruction may be executed in preamble 39A (e.g., "ADD z, y, x;" will add the values in "x" and "y" together and store the resulting value in "z"). Each of the redundant instructions is likewise executed. The redundant values may be saved to constant memory 44 via, e.g., a store data into constant memory instruction (e.g., "STC c[5], z;" stores the value in "z" into constant RAM at location 5). The redundant values may also be moved to uGPR 27 or GPR 26. The next exemplary instruction may load a number of constants from a constant buffer into constant memory 44 via, e.g., a load constant instruction (e.g. "LDC c[10], index, CB1, 4;" will load 4 constants from constant buffer (CB) 1 into constant RAM starting at location 10 ).

The next set of instructions in the preamble is a set of instructions configured to allow GPU 14 to identify and nullify unnecessary instructions in a shader program. The instruction Identify_Unnecessary (Main shader) is code configured to detect unnecessary instructions, as described above. In some examples, the Identify_Unnecessary instruction analyzes all instructions in the main shader (e.g., the instructions of the draw call). In other examples, the Identify Unnecessary instruction analyzes a subset of the instructions in the main shader.

The next set of instructions preamble 39A are those that nullify the instructions found to be unnecessary. The branch 'If Identify Unnecessary (instruction X)=true' causes shader core 24 to convert instruction X (e.g., where X is a program counter value) to a NOP instruction ('Instruction X=NOP') when the Identify Unnecessary code determines that instruction X is unnecessary. The clause then proceeds to the next instruction value (X++). Otherwise, in the else branch, shader core 24 proceeds to the next instruction value (X++) without any change to instruction X. That is, if the Identify Unnecessary code did not determine the instruction to be unnecessary, the instruction is not converted to a NOP instruction.

Shader preamble 39A closes with a shader preamble end instruction (SHPE). In certain implementations, there may only be a single shader preamble start and shader preamble end instruction in a shader program 32, 34, or 36. Following shader preamble 39A are main shader instructions 41A.

In one example, shader preamble 39A is only executed a single time regardless of the number of warps of execution of the shader program 32, 34, or 36. Main shader instructions 41 are executed separately for each warp. Results generated in the execution of shader preamble 39A may be utilized in the execution of main shader instructions 41A and stored in constant memory 44. At execution, shader core 24 may utilize a variety of flags to determine whether shader preamble 39A has executed and thus does not need to execute the preamble code of shader preamble 39A a second time as well as determine where the result(s) of the execution of the shader preamble 39A are stored within constant memory 44. The variety of flags may include a flag denoting that a current warp is the first warp (or, in another example, that it is not the first warp) and a flag denoting the first warp has (or, in another example, has not) completed execution of the shader preamble instructions. These flags may be stored, by GPU 14, in an on-chip internal state register, constant memory 44 or GPU memory 42.

While the shader preamble 39A is illustrated as being in the beginning of shader code 37A prior to main shader instructions 41A, shader preamble 39A may be interspersed inside shader code 37A only being delimited by the shader preamble start instruction (e.g. SHPS) and shader preamble end instruction (SHPE). Furthermore, a shader preamble may be inside a control flow. If a shader preamble is inside a control flow, the warp to execute the preamble may not be the first warp of the shader.

In another example of the disclosure, compiler 38 may be configured to determine what instructions compiler 38 issued during compile time may fit a particular structure that may cause such instructions to be unnecessary. Compiler 38 may be configured to produce code into a preamble that checks particular constant values for instructions that may be unnecessary. Instructions that have a structure that may indicate the instruction may be unnecessary may include instructions that write the result of the instruction to the source of the variable for the instruction, such as an accumulation register. For example, shown in FIG. 3B, compiler 38 may be configured to emit code (check_const(x)) into preamble 39B of instructions 37B that analyzes instructions of the type Dest=const*input+dest. In this example, dest is the both the input variable (e.g., memory location) and the output of the instruction, input is an input variable, and const is a constant value. For this instruction type (i.e., Dest=const*input+dest), the instruction check_const(x) would check if the constant value is zero or not. If the constant value (const) is zero, the output value (dest) would be unchanged for all values of input, and thus the instruction would be unnecessary. In the example of FIG. 3B, instructions 3 and 5 in main shader 41B are of the instruction type that causes compiler 38 to insert the check_const(x) instruction in to preamble 39B. If the constant value (const) is non-zero, the output value (dest) may be changed for particular values of input, and thus the instruction would not be unnecessary. The instruction then, may be nullified according to the techniques discussed above with reference to FIG. 3A, or as will be discussed below with reference to FIG. 3C.

FIG. 3C shows another alternative preamble code 39C that sets a 1-bit instruction memory rather than overwriting detected unnecessary instructions with a NOP. Like the examples in FIG. 3A or FIG. 3B, instructions 37C include a preamble 39C and main shader 41C. The instruction Identify_Unnecessary (Main shader) is code configured to detect unnecessary instructions. In other examples of FIG. 3C, the techniques of FIG. 3B may be used to identify unnecessary instructions. The next set of instructions preamble 39C are those that nullify the instructions found to be unnecessary. The branch 'If Identify_Unnecessary (instruction X)=true' causes shader core 24 to write a '1' value to a 1-bit instruction memory (NOP Reg X) that indicates to the processing elements of shader core 24 that associated instruction X is not to be executed. The clause then proceeds to the next instruction value (X++). Otherwise, in the else branch, shader core 24 writes a '0' value to a 1-bit instruction memory (NOP_Reg_X) that indicates to the processing elements of shader core 24 that associated instruction X is to be executed. Shader core 24 then proceeds to the next instruction (X++).

Figure 4:
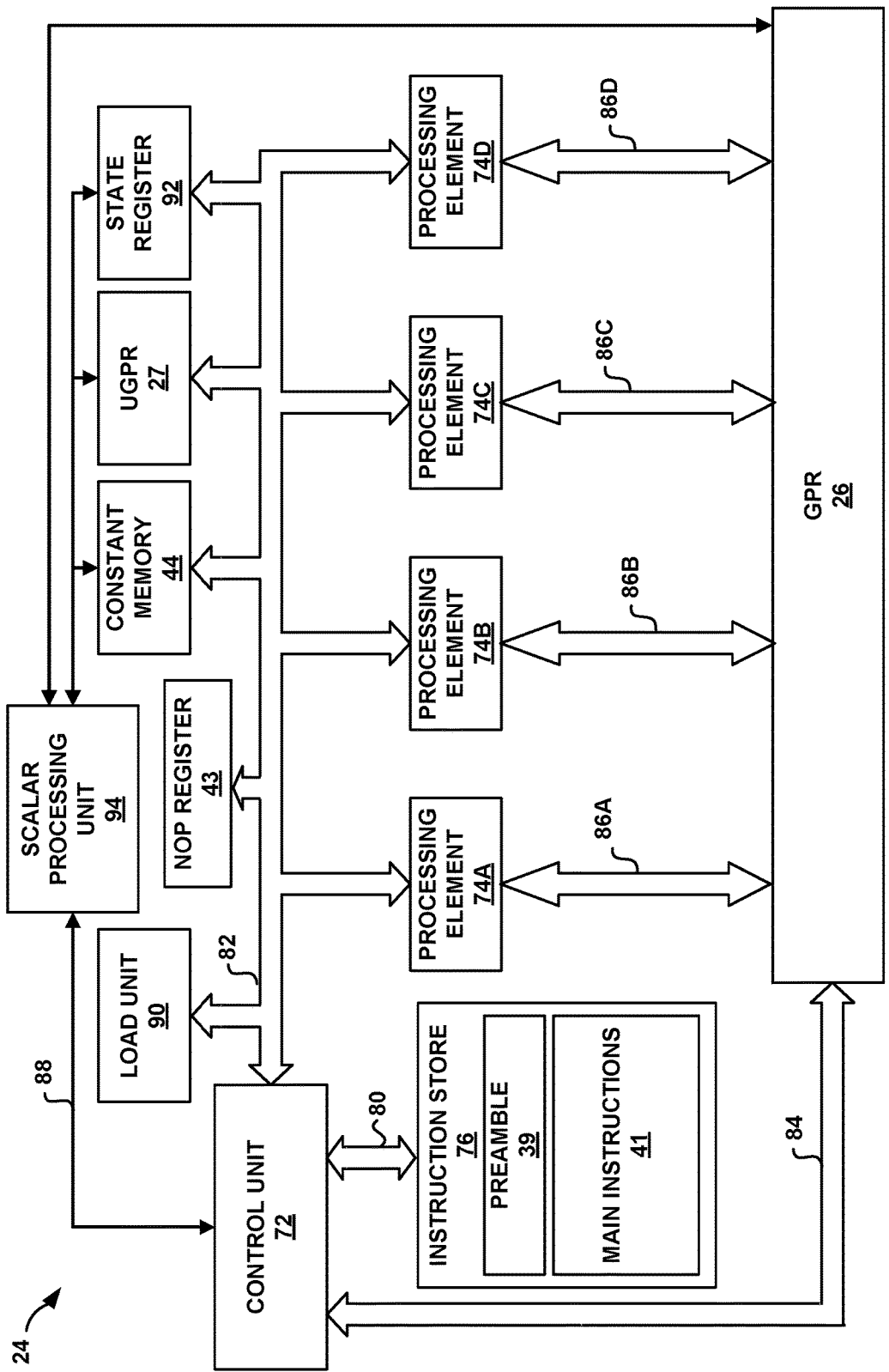
FIG. 4 is a block diagram of an example shader core of the GPU of FIG. 1 in more detail.

FIG. 4 is a block diagram illustrating an example configuration of GPU 14 that may be used to implement the techniques of this disclosure for identifying and nullifying unnecessary instructions. GPU 14 is configured to execute instructions for a program in a parallel manner. GPU 14 includes a shader core 24 that includes a control unit 72, processing elements 74A, 74B, 74C, 74D (collectively "processing elements 74"), instruction store 76, GPR 26, constant memory 44, uGPRs 27, state registers 92, communication paths 80, 82, 84, 86A-86D, NOP register 43, and a load unit 90. Communication paths 86A, 86B, 86C, 86D may be referred to collectively as "communication paths 86." In some examples, GPU 14 may be configured as a single-instruction, multiple-data (SIMD) processing system that is configured to execute a plurality of threads of execution for a warp of a program (e.g., shader) using processing elements 74. In such a SIMD system, processing elements 74 may together process a single instruction at a time with respect to different data items. The program may retire after all of the threads associated with the program complete execution.

Control unit 72 is communicatively coupled to instruction store 76 via communication path 80, to processing elements 74 via communication path 82, and to GPR 26 via communication path 84. Control unit 72 may use communication path 80 to send read instructions to instruction store 76. A read instruction may specify an instruction address in instruction store 76 from which an instruction should be retrieved. Control unit 72 may receive one or more program instructions from instruction store 76 in response to sending the read instruction.

In one example of the disclosure, control unit 72 may read shader preamble 39 and main shader instructions 41 from instruction store 76. Control unit 72 may determine whether the preamble has been previously executed (via a flag stored in on-chip state register 92, uGPR 27, or GPR 26). Control unit 72 may determine whether the current warp is the first warp (via a flag stored in on-chip state register 92, uGPR 27, or GPR 26). Control unit 72 may also change the foregoing flags when the underlying state changes (e.g., the preamble has been executed and/or the current warp is not the first warp). Use of the foregoing flags by control unit 72 may ensure that the preamble code is only executed a single time and that no subsequent (e.g. second, third, etc.) warps may begin before the preamble has completed execution. In addition, as described above, preamble 39 may be configured to detect and nullify unnecessary instructions.

Control unit 72 may use communication path 82 to provide instructions to processing elements 74, and in some examples, to receive data from processing elements 74, e.g., the result of a comparison instruction for evaluating a branch condition. In some examples, control unit 72 may use communication path 84 to retrieve data items values from state register 92, uGPR 27, GPR 26, or constant memory 44, e.g., to determine a branch condition. Although FIG. 4 illustrates GPU 14 as including a communication path 84, in other examples, GPU 14 may not include a communication path 84.

Constant values, before execution of a draw call, may be originally stored in constant buffers in system memory 16. Load unit 90 may load, via instructions from control unit 72, compiler 38, and/or graphics driver 40, the constant values from the constant buffers in system memory 16 to constant memory 44, uGPR 27, or GPR 26. Load unit 90 may be configured to load constants in uGPR 27 if space allocated in constant memory 44 is full.

Each of processing elements 74 may be configured to process instructions for the program stored in instruction store 76. In some examples, each of processing elements 74 may be configured to perform the same set of operations. For example, each of processing elements 74 may implement the same instruction set architecture (ISA). In additional examples, each of processing elements 74 may be an arithmetic logic unit (ALU). In further examples, GPU 14 may be configured as a vector processor, and each of processing elements 74 may be a processing element within the vector processor. In additional examples, GPU 14 may be a SIMD execution unit, and each of processing elements 74 may be a SIMD processing element within the SIMD execution unit.

The operations performed by processing elements 74 may include arithmetic operations, logic operations, comparison operations, etc. Arithmetic operations may include operations such as, e.g., an addition operation, a subtraction operation, a multiplication operation, etc. The arithmetic operations may also include, e.g., integer arithmetic operations and/or floating-point arithmetic operations. The logic operations may include operations, such as, e.g., a bit-wise AND operation, a bit-wise OR operation, a bit-wise XOR operation, etc. The comparison operations may include operations, such as, e.g., a greater than operation, a less than operation, an equal to zero operation, a not equal to zero operation, etc. The greater than and less than operations may determine whether a first data item is greater than or less than a second data item. The equal to zero and not equal to zero operations may determine whether a data item is equal to zero or not equal to zero. The operands used for the operations may be stored in registers contained in GPR 26 or uGPR 27.

Each of processing elements 74 may be configured to perform an operation in response to receiving an instruction from control unit 72 via communication path 82. In some examples, each of processing elements 74 may be configured to be activated and/or deactivated independently of the other processing elements 74. In such examples, each of processing elements 74 may be configured to perform an operation in response to receiving an instruction from control unit 72 when the respective processing element 74A-74D is activated, and to not perform the operation in response to receiving the instruction from control unit 72 when the respective processing element 74A-74D is deactivated, i.e., not activated.

Each of processing elements 74A-74D may be communicatively coupled to GPR 26 via a respective communication path 86A-86D. Processing elements 74 may be configured to retrieve data from GPR 26, uGPR 27, and/or constant memory 44 and store data to GPR 26 via communication paths 86, uGPR 27, and/or constant memory 44. The data retrieved from GPR 26, uGPR 27, and/or constant memory 44 may, in some examples, be operands for the operations performed by processing elements 74. The data stored in GPR 26, uGPR 27, and/or constant memory 44 may, in some examples, be the result of an operation performed by processing elements 74.

Rather than detecting and nullifying unnecessary instructions using code in preamble 39, in another example, shader core 24 may be configured to identify unnecessary instructions by simply first executing the instructions in one warp of the draw call. That is, rather than using preamble code to detect unnecessary instructions before they are executed, all instructions of a draw call may be executed in a first warp, and then those instructions that do not change the output value (or otherwise determined to be unnecessary) may be nullified such that the nullified instructions are not performed for some or all subsequent warps of the same draw call. However, it should be understood that there is no strict sequencing requirement in this example of the disclosure. It is possible that some subsequent warps will still execute the 'unnecessary' instruction due to pipeline delays. Shader core 24 may redundantly mark the instruction as 'unnecessary' in such subsequent waves. Such a condition is not problematic, as there is nothing functionally wrong with shader core 24 executing the unnecessary instruction. Any pipeline delays will simply reduce the amount of benefit seen by the optimization. It should also be understood that, in this example, shader core 24 may still execute preamble 39 for reasons other than detecting and nullifying instructions. For example, shader core 24 may execute preamble 39 in execute common and/or redundant instructions once for a draw call.

In one example, processing elements 74 may be configured to execute instructions for a draw call in one warp. During the execution of the instructions, processing elements 74 or control unit 72 may be configured to determine whether or not an output for a particular one of the received instructions has changed after execution. If the output of the instruction did not change, processing elements 74 or control unit 72 may determine that the particular one of the received instructions is unnecessary. Processing elements 74 or control unit 72 may then nullify the particular one of the received instructions determined to be unnecessary. Processing elements 74 may then execute subsequent warps of the draw call without executing the nullified instructions.

In one example of the disclosure, processing elements 74 and/or control unit 72 may be configured to nullify instructions determined to be unnecessary by writing a value to NOP register 83. NOP register 83 is a memory that includes memory locations (e.g., 1-bit memory locations) associated with each of main instructions 41. For example, processing elements 74 and/or control unit 72 may be configured to write a '1' value to NOP register 43 that indicates that the associated instruction is not to be executed by processing elements 74. Processing elements may then execute or not execute instructions according to the values in NOP register 43 for all subsequent warps of the draw call. In some examples, control unit 72 may be configured to reset all values of NOP register 43 to '0' (or whatever indication is used to indicate that an instruction is to be performed) prior to execution of the next draw call. In another example, control unit 72 and/or processing elements 74 may be configured to overwrite the particular one of the received instructions determined to be unnecessary with a NOP instruction.

Instruction store 76 is configured to store a program for execution by GPU 14. The program may be stored as a sequence of instructions. These instructions may include shader preamble 39 and main shader instructions 41. In some examples, each instruction may be addressed by a unique instruction address value. In such examples, instruction address values for later instructions in the sequence of instructions are greater than instruction address values for earlier instructions in the sequence of instructions. The program instructions, in some examples, may be machine-level instructions. That is, in such examples, the instructions may be in a format that corresponds to the ISA of GPU 14. Instruction store 76 is configured to receive a read instruction from control unit 72 via communication path 80. The read instruction may specify an instruction address from which an instruction should be retrieved. In response to receiving the read instruction, instruction store 76 may provide an instruction corresponding to the instruction address specified in the read instruction to control unit 72 via communication path 80.

Instruction store 76 may be any type of memory, cache or combination thereof. When instruction store 76 is a cache, instruction store 76 may cache a program that is stored in a program memory external to GPU 14. Although instruction store 76 is illustrated as being within GPU 14, in other examples, instruction store 76 may be external to GPU 14.

GPR 26 is configured to store data items used by processing elements 74. In some examples, GPR 26 may comprise a plurality of registers, each register being configured to store a respective data item within a plurality of data items operated on GPU 14. GPR 26 may be coupled to one or more communication paths (not shown) that are configured to transfer data between the registers in GPR 26 and a memory or cache (not shown).

uGPR 27 is configured to store data items used by processing elements 74 and each memory element within uGPR 27 is configured to be accessible by multiple processing elements (e.g. threads/fibers) of a warp.

State register 92, uGPR 27, or GPR 26 may store a number of flags used by control unit 72. Flags stored in state register 92, uGPR 27, or GPR 26 may include a flag to denote that the preamble has been previously executed. This flag may allow control unit 72 to time the processing of the threads in the warp to begin after the shader preamble 39 has completely executed and the results of the execution are stored in constant memory 44, uGPR 27, and/or GPR 26. The flag denoting that the preamble has been previously executed may initially be set to "off" in state register 92, uGPR 27, or GPR 26. State register 92, uGPR 27, or GPR 26 may also include a flag to denote that the current warp is the first warp. The flag denoting that the current warp is the first warp may initially be set to "on."

Although FIG. 4 illustrates a single GPR 26 for storing data used by processing elements 74, in other examples, GPU 14 may include separate, dedicated data stores for each of processing elements 74. GPU 14 illustrates four processing elements 74 for exemplary purposes. In other examples, GPU 14 may have many more processing elements in the same or a different configuration.

Control unit 72 is configured to control GPU 14 to execute instructions for a program stored in instruction store 76. For each instruction or set of instructions of the program, control unit 72 may retrieve the instruction from instruction store 76 via communication path 80, and process the instruction. In some examples, control unit 72 may process the instruction by causing an operation associated with the instruction to execute on one or more of processing elements 74. For example, the instruction retrieved by control unit 72 may be an arithmetic instruction that instructs GPU 14 to perform an arithmetic operation with respect to data items specified by the instruction, and control unit 72 may cause one or more of processing elements 74 to perform the arithmetic operation on the specified data items. In further examples, control unit 72 may process the instruction without causing an operation to be performed on processing elements 74.

Control unit 72 may cause an operation to be performed on one or more of processing elements 74 by providing an instruction to processing elements 74 via communication path 82. The instruction may specify the operation to be performed by processing elements 74. The instruction provided to the one or more of processing elements 74 may be the same as or different than the instruction retrieved from instruction store 76. In some examples, control unit 72 may cause the operation to be performed on a particular subset of processing elements 74 (including by a single processing element) by one or both of activating a particular subset of processing elements 74 upon which the operation should be performed and deactivating another subset of processing elements 74 upon which the operation should not be performed. Control unit 72 may activate and/or deactivate processing elements 74 by providing respective activation and/or deactivation signals to each of processing elements 74 via communication path 82.

In some examples, control unit 72 may activate and/or deactivate processing elements 74 by providing activation and/or deactivation signals to processing elements 74 in conjunction with providing an instruction to processing elements 74. In further examples, control unit 72 may activate and/or deactivate processing elements 74 prior to providing an instruction to processing elements 74.

Control unit 72 may execute a plurality of threads of execution for a program using processing elements 74. A plurality of threads to be executed in parallel is sometimes called a warp. Each of processing elements 74 may be configured to process instructions of the program for a respective thread of the plurality of threads. For example, control unit 72 may assign each thread of execution to an individual one of processing elements 74 for processing. The threads of execution for the program may execute the same set of instructions with respect to different data items in a set of data items. For example, processing element 74A may execute a first thread of execution for a program stored in instruction store 76 with respect to a first subset of data items in a plurality of data items, and processing element 74B may execute a second thread of execution for the program stored in instruction store 76 with respect to a second subset of data items in the plurality of data items. The first thread of execution may include the same instructions as the second thread of execution, but the first subset of data items may be different than the second subset of data items. Processing elements 74 may execute main shader instructions 41. Processing elements 74 may execute shader preamble 39. In another example, shader core 24 may utilize a separate scalar processing unit 94, via communications path 88, to execute the instructions of shader preamble 39.

Scalar processing unit 94 may be any type of processor that is configured to operate on one data item at a time. Like processing elements 74, scalar processing unit 94 may include an ALU. The operations performed by scalar processing unit 94 may include arithmetic operations, logic operations, comparison operations, etc. Arithmetic operations may include operations such as, e.g., an addition operation, a subtraction operation, a multiplication operation, a division operation, etc. The arithmetic operations may also include, e.g., integer arithmetic operations and/or floating-point arithmetic operations. The logic operations may include operations, such as, e.g., a bit-wise AND operation, a bit-wise OR operation, a bit-wise XOR operation, etc. The comparison operations may include operations, such as, e.g., a greater than operation, a less than operation, an equal to zero operation, a not equal to zero operation, etc. The greater than and less than operations may determine whether a first data item is greater than or less than a second data item. The equal to zero and not equal to zero operations may determine whether a data item is equal to zero or not equal to zero. The operands used for the operations may be stored in registers contained in GPR 26.

Figure 5:
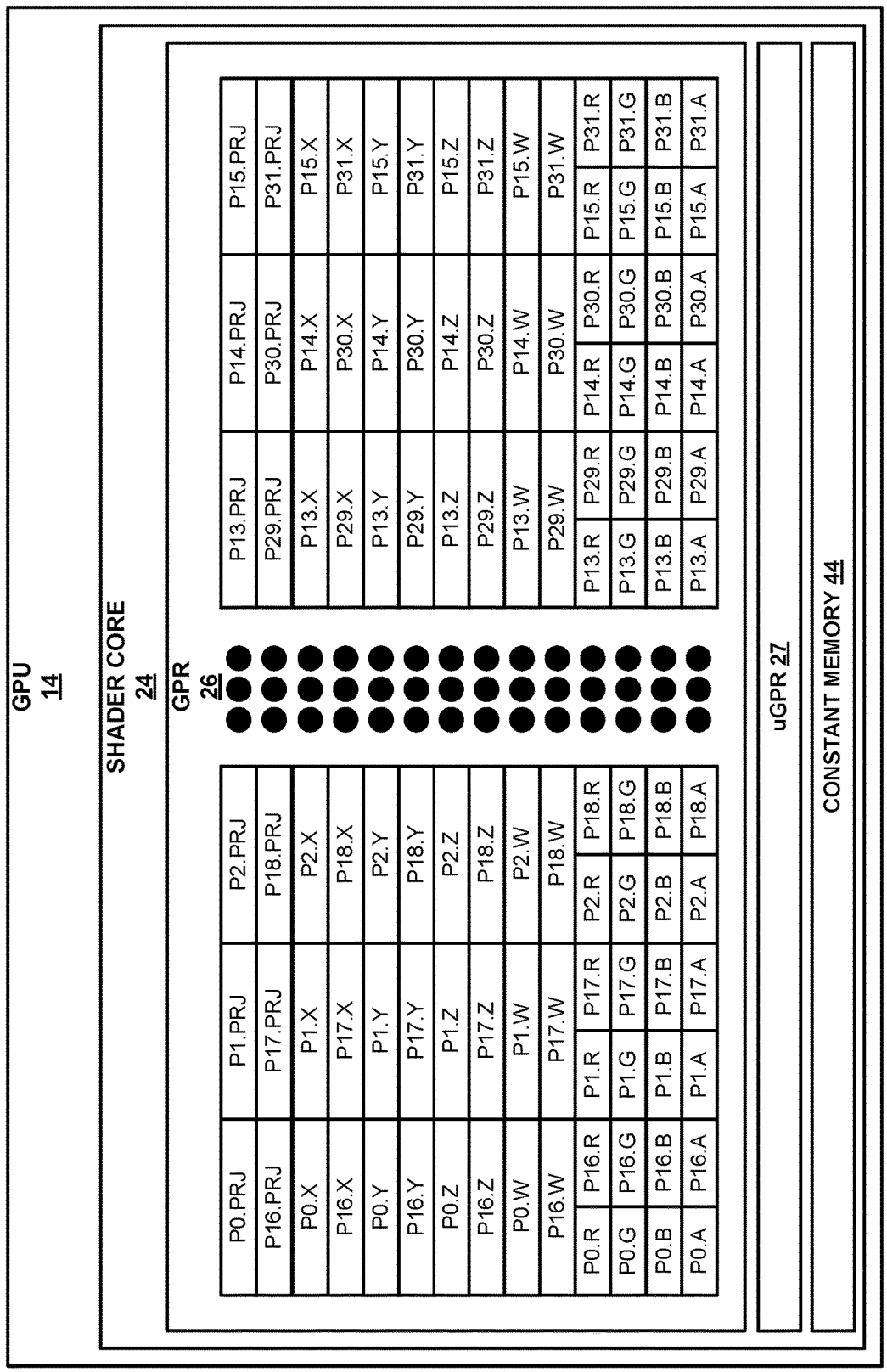
FIG. 5 is a conceptual diagram illustrating an example of data storage in a general purpose register (GPR) of a shader core of a GPU.

FIG. 5 is a conceptual diagram illustrating an example of data storage in a GPR of a shader core of a GPU. As illustrated, GPU 14 includes shader core 24, and shader core 24 includes GPR 26. As an example, shader core 24 may include thirty-two processing elements and each may execute one instance of a shader program to process one graphics item. GPR 26 may store data for the graphics items. For instance, GPR 26 may store attribute data for nine attributes for thirty-two graphics items. However, GPR 26 may store data for more or less than nine attributes for the thirty-two graphics items. Also, GPR 26 may store data that is not associated with an attribute of the graphics items, but is the data for a variable needed for processing the graphics items.

In the example illustrated in FIG. 5, the graphics items are identified as P0-P31, which may be vertices. The attribute is identified by the variable following the graphics item identifier. For example, P0.X refers to the x-coordinate for the P0 graphics item, P0.Y refers to the y-coordinate for the P0 graphics item, and so forth. P0.R, P0.G, P0.B, and P0.A refer to the red component, green component, blue component, and opacity of the P0 graphics item, respectively. The other graphics items (e.g., P1-P31) are similarly identified.

In other words, in FIG. 5, vertices P0-P31 are each associated with a plurality of variables. As one example, each of vertices P0-P31 is associated with a variable that identifies the x-coordinate (P0.X to P31.X). Each of vertices P0-P31 is associated with a variable that identifies the y-coordinate (P0.Y to P31Y), and so forth. Each one of these variables is needed for processing each of the plurality of graphics items. For instance, the variable that identifies the x-coordinate is needed for processing each of vertices P0-P31.

As also illustrated in FIG. 5, each of the graphics items also includes a PRJ attribute. The PRJ attribute is a projection matrix that a vertex shader executing on processing elements of shader core 24 may utilize. In this example, the PRJ attribute is another variable that is needed for processing each of vertices PO-P31. For example, the vertex shader may multiply the projection matrix with the respective coordinates (e.g., multiply P0.PRJ with P0.X, P0.Y, P0.Z, and P0.W).

It should be understood that there may be various units in which GPU 14 may store data (e.g., values). GPU 14 may store data in system memory 16 or may store data in local memory (e.g., cache). GPR 26 of shader core 24 is distinct from both system memory 16 and the local memory of GPU 14. For example, system memory 16 is accessible by various components of device 10, and these components use system memory 16 to store data. The local memory of GPU 14 is accessible by various components of GPU 14, and these components use the local memory of GPU 14 to store data. GPR 26, however, may only be accessible by components of shader core 24, and may only store data for the processing elements of shader core 24.

In some examples, one or more variables of graphics items in a graphic warp are uniform across the graphic warp. In such examples, rather than storing the uniform data for the one or more variables in separate entries for each thread/fiber in GPR 26, GPU 14 may store the uniform data a single time in uGPR 27 accessible by all threads/fibers in a warp or in constant memory 44.

In one example, uGPR 27 may include a plurality of storage locations, where each storage location is associated with one attribute of the plurality of attributes of the graphics items. For instance, as illustrated in FIG. 5, each graphics item P0-P31 includes nine attributes (PRJ, x, y, z, w, R, G, B, and A). In this example, uGPR 27 may include nine storage locations, where the first location of uGPR 27 is associated with PRJ attribute, the second location of the uGPR 27 is associated with the x-coordinate, and so forth. Again, the data in uGPR 27 may be used by each thread of a warp.

Constants may be stored in constant buffers in system memory. Constant load instructions may be utilized to allow the compiler to load constants from system memory into constant memory 44. Constants may also be stored in GPR 26 and uGPR 27 if constant memory 44 is full.

Traditionally, no data may be saved between warps. In some examples, GPRs 26 and uGPRs 27 are reloaded or recalculated for each warp. Constant memory 44 may be saved between warps. Shader core 24, however, may access preamble instructions and execute them during the first warp. After the instructions have been executed, subsequent warps may access the result of these instructions in constant memory 44.

Figure 6:
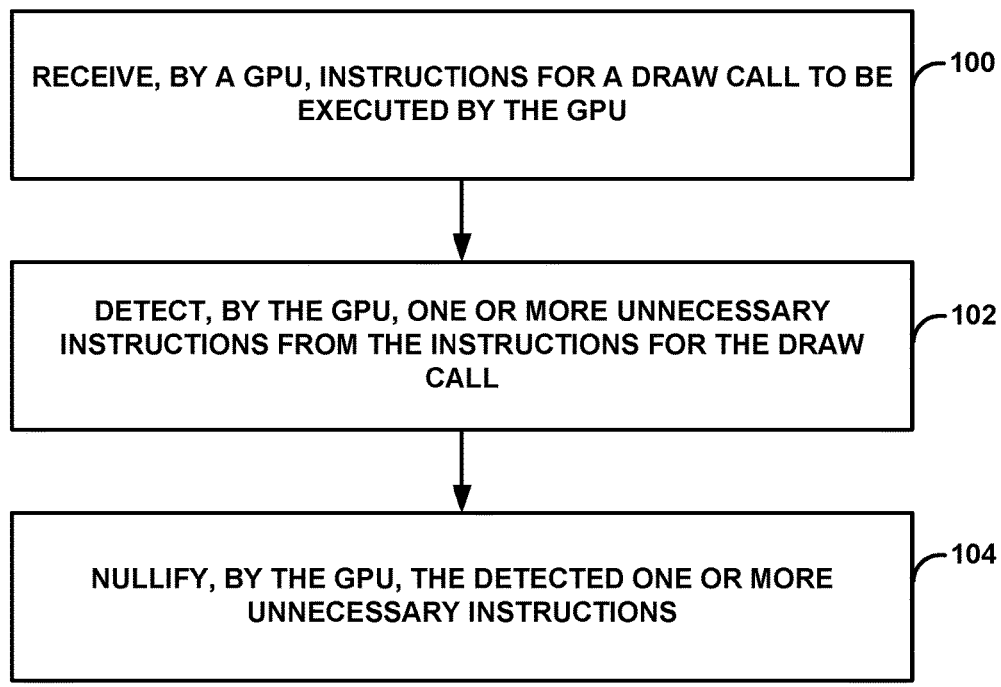
FIG. 6 is a flowchart illustrating an example technique of processing data in a GPU.

FIG. 6 is a flowchart illustrating an example method according to the techniques of this disclosure. The techniques of FIG. 6 may be implemented by one or more of GPU 14 and/or processor 12 (see FIGS. 1 and 2).

In one example of the disclosure, GPU 14 may be configured to receive instructions for a draw call to be executed by the GPU (100), detect, by the GPU, one or more unnecessary instructions from the instructions for the draw call (102), and nullify, by the GPU, the detected one or more unnecessary instructions (104). In one example, detecting the unnecessary instructions comprises detecting, by the GPU, the one or more unnecessary instructions before executing the instructions for the draw call. In another example, the one or more unnecessary instructions are instructions that do not alter an output of a particular one of the received instructions for the draw call. In another example, GPU 14 may be further configured to receive constants to be used when executing the instructions for the draw call, wherein detecting the one or more unnecessary instructions comprises detecting the one or more unnecessary instructions based on the received constants.

In one example of the disclosure, GPU 14 may be configured to detect and nullify unnecessary instructions using preamble code. In this example of the disclosure, GPU 14 may be configured to execute preamble code before executing the instructions for the draw call. Executing the preamble code detects the one or more unnecessary instructions, and nullifies the detected one or more unnecessary instructions, and comprises determining values for the received constants, determining whether or not an output for a particular one of the received instructions will change based on a value of a particular received constant used for the particular one of the received instructions, determining that the particular one of the received instructions is unnecessary if the output is determined to not change, and nullifying the determined particular one of the received instructions if the output is determined to not change. GPU 14 may be further configured to execute the instructions for the draw call without executing the nullified unnecessary instructions.

In another example of the disclosure, GPU 14 may be configured to nullify the determined particular one of the received instructions by overwriting the determined particular one of the received instructions with a no operation. In another example of the disclosure, GPU 14 may be configured to nullify the determined particular one of the received instructions by writing a value to a register associated with the determined particular one of the received instructions, wherein the value in the register indicates that the GPU is not to perform the determined particular one of the received instructions.

In another example of the disclosure, GPU 14 may employ a hardware-based approach to identify and nullify unnecessary instructions. In this example of the disclosure, GPU 14 may be configured to execute the instructions for the draw call in a first warp of the draw call, determine whether or not an output for a particular one of the received instructions changed when executed, determine that the particular one of the received instructions is unnecessary if the output did not change, nullify the determined particular one of the received instructions, and execute at least some subsequent warps of the draw call without executing the nullified instructions.

In one example of the disclosure, GPU 14 may be configured to nullify the determined particular one of the received instructions by writing a value to a register associated with the determined particular one of the received instructions, wherein the value in the register indicates that the GPU is not to perform the determined particular one of the received instructions. In another example of the disclosure GPU 14 may be configured to nullify the determined particular one of the received instructions by overwriting the determined particular one of the received instructions with a no operation.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media. In this manner, computer-readable media generally may correspond to tangible computer-readable storage media which is non-transitory. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. It should be understood that computer-readable storage media and data storage media do not include carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of graphics processing, the method comprising:
   compiling instructions for a draw call, wherein the compiled instructions include preamble instructions and main instructions, and wherein the draw call is executable in a first warp and a plurality of other warps;
   receiving, by a graphics processing unit (GPU), the preamble instructions and the main instructions for the draw call to be executed by the GPU;
   loading constants to a constant memory, wherein the constants are used when executing the instructions for the draw call;
   executing the preamble instructions once in the first warp of the draw call before executing the main instructions in the plurality of other warps of the draw call, wherein the preamble instructions are configured to:
      detect one or more unnecessary instructions from the main instructions for the draw call based on the constants, wherein the one or more unnecessary instructions are instructions that do not alter an output of a particular one of the received main instructions for the draw call, and
      nullify the detected one or more unnecessary instructions, wherein nullifying the detected one or more unnecessary instructions comprises one of overwriting the detected one or more unnecessary instructions with a no operation or writing a value to a register associated with the detected one or more unnecessary instructions, wherein the value in the register indicates that the GPU is not to perform the detected one or more unnecessary instructions; and
   executing the main instructions in the plurality of other warps of the draw call after executing the preamble instructions.

2. An apparatus for graphics processing, the apparatus comprising:
   a processor configured to compile instructions for a draw call, wherein the compiled instructions include preamble instructions and main instructions, and wherein the draw call is executable in a first warp and a plurality of other warps, and
   load constants to a constant memory, wherein the constants are used when executing the instructions for the draw call; and
   a graphics processing unit (GPU) configured to:
      receive the preamble instructions and the main instructions for the draw call to be executed by the GPU;
      execute the preamble instructions once in the first warp of the draw call before executing the main instructions in the plurality of other warps of the draw call, wherein the preamble instructions are configured to:
         detect one or more unnecessary instructions from the instructions for the draw call based on the constants, wherein the one or more unnecessary instructions are instructions that do not alter an output of a particular one of the received main instructions for the draw call, and
         nullify the detected one or more unnecessary instructions, wherein to nullify the detected one or more unnecessary instructions, the GPU is further configured to perform one of overwriting the detected one or more unnecessary instructions with a no operation or writing a value to a register associated with the detected one or more unnecessary instructions, wherein the value in the register indicates that the GPU is not to perform the detected one or more unnecessary instructions; and
      execute the main instructions in the plurality of other warps of the draw call after executing the preamble instructions.

3. An apparatus for graphics processing, the apparatus comprising:
   means for compiling instructions for a draw call, wherein the compiled instructions include preamble instructions and main instructions, and wherein the draw call is executable in a first warp and a plurality of other warps;
   means for receiving the preamble instructions and the main instructions for the draw call to be executed by a graphics processing unit (GPU);
   means for loading constants to a constant memory, wherein the constants are used when executing the instructions for the draw call;
   means for executing the preamble instructions once in the first warp of the draw call before executing the main instructions in the plurality of other warps of the draw call, wherein the preamble instructions are configured to:
      detect one or more unnecessary instructions from the instructions for the draw call based on the constants, wherein the one or more unnecessary instructions are instructions that do not alter an output of a particular one of the received main instructions for the draw call, and nullify the detected one or more unnecessary instructions, wherein nullifying the detected one or more unnecessary instructions comprises one of overwriting the detected one or more unnecessary instructions with a no operation or writing a value to a register associated with the detected one or more unnecessary instructions, wherein the value in the register indicates that the GPU is not to perform the detected one or more unnecessary instructions; and means for executing the main instructions in the plurality of other warps of the draw call after executing the preamble instructions.

4. A non-transitory computer-readable storage medium storing instructions that, when executed, causes one or more processors of a device for graphics processing to:

compile instructions for a draw call, wherein the compiled instructions include preamble instructions and main instructions, and wherein the draw call is executable in a first warp and a plurality of other warps; and load constants to a constant memory, wherein the constants are used when executing the instructions for the draw call;

receive the preamble instructions and the main instructions for the draw call to be executed by a graphics processing unit (GPU);

execute the preamble instructions once in the first warp of the draw call before executing the main instructions in the plurality of other warps of the draw call, wherein the preamble instructions are configured to:

detect one or more unnecessary instructions from the instructions for the draw call based on the constants, wherein the one or more unnecessary instructions are instructions that do not alter an output of a particular one of the received main instructions for the draw call, and nullify the detected one or more unnecessary instructions, wherein to nullify the detected one or more unnecessary instructions, the instructions further cause the one or more processors to perform one of overwriting the detected one or more unnecessary instructions with a no operation or writing a value to a register associated with the detected one or more unnecessary instructions, wherein the value in the register indicates that the GPU is not to perform the detected one or more unnecessary instructions; and execute the main instructions in the plurality of other warps of the draw call after executing the preamble instructions.

* * * * *